(12) United States Patent
Hong

(10) Patent No.: US 10,752,222 B2
(45) Date of Patent: Aug. 25, 2020

(54) INSTALLATION STRUCTURE FOR PEDAL STROKE SENSOR

(71) Applicant: MANDO CORPORATION, Gyeonggi-do (KR)

(72) Inventor: Kwang Seok Hong, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 144 days.

(21) Appl. No.: 16/147,524

(22) Filed: Sep. 28, 2018

(65) Prior Publication Data
    US 2019/0100173 A1    Apr. 4, 2019

(30) Foreign Application Priority Data

Sep. 29, 2017 (KR) ............... 10-2017-0014472
Sep. 29, 2017 (KR) ............... 10-2017-0126995
Sep. 29, 2017 (KR) ............... 10-2017-0127002

(51) Int. Cl.
    *B60T 8/00* (2006.01)
    *B60T 7/04* (2006.01)
    *B60T 8/32* (2006.01)

(52) U.S. Cl.
    CPC ............ *B60T 7/042* (2013.01); *B60T 8/3255* (2013.01); *B60T 2220/04* (2013.01)

(58) Field of Classification Search
    CPC ........................ B60T 7/042; B60T 8/3255
    USPC ............................................ 73/129
    See application file for complete search history.

(56) References Cited

U.S. PATENT DOCUMENTS

2017/0297546 A1* 10/2017 Takeda ................ B60T 13/662

FOREIGN PATENT DOCUMENTS

| KR | 1998-030367    | 7/1998 |
| KR | 10-2012-0034757 | 4/2012 |
| KR | 10-2012-0039171 | 4/2012 |

* cited by examiner

*Primary Examiner* — Jamel E Williams
(74) *Attorney, Agent, or Firm* — Ladas & Parry, LLP

(57) ABSTRACT

Disclosed herein is an installation structure for a pedal stroke sensor, including: a piston configured to move forward and backward by an operation of a pedal; a mounting member disposed on the piston; a first shaft coupled with the mounting member; a second shaft including a second gear engaged with a first gear of the first shaft; and a measuring portion disposed on the second shaft.

13 Claims, 15 Drawing Sheets

[FIG. 1]
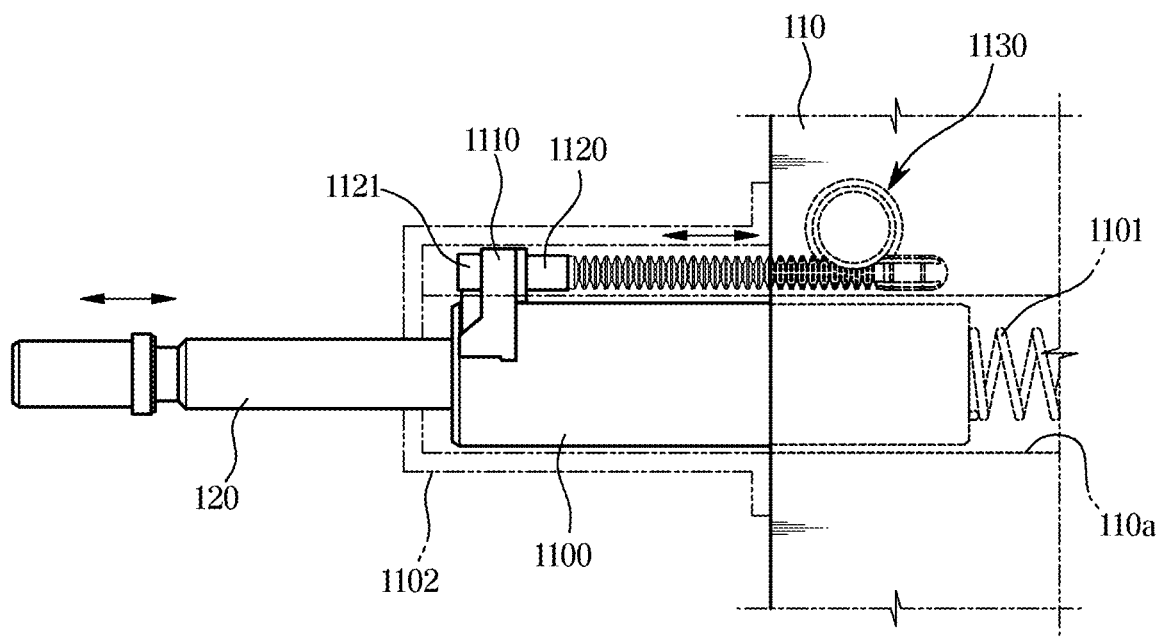

[FIG. 2]
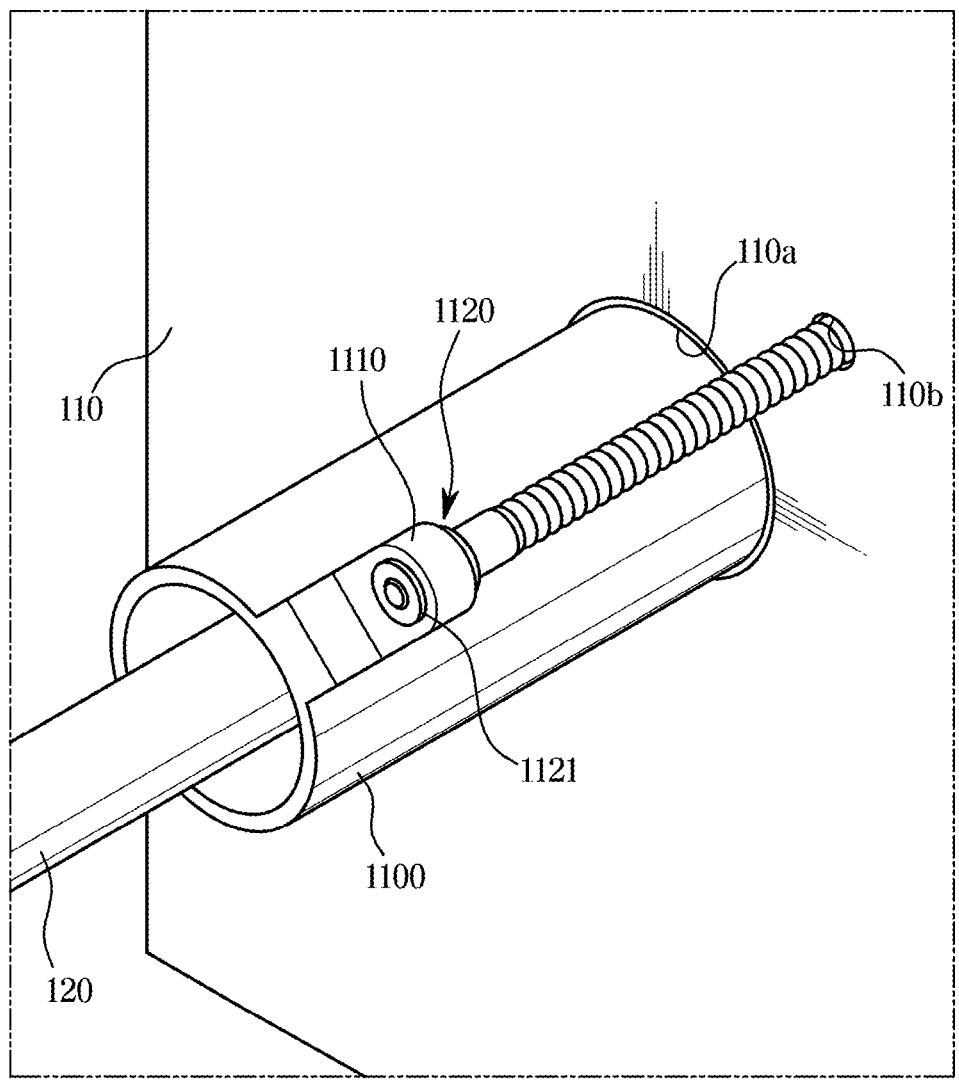

[FIG. 3]
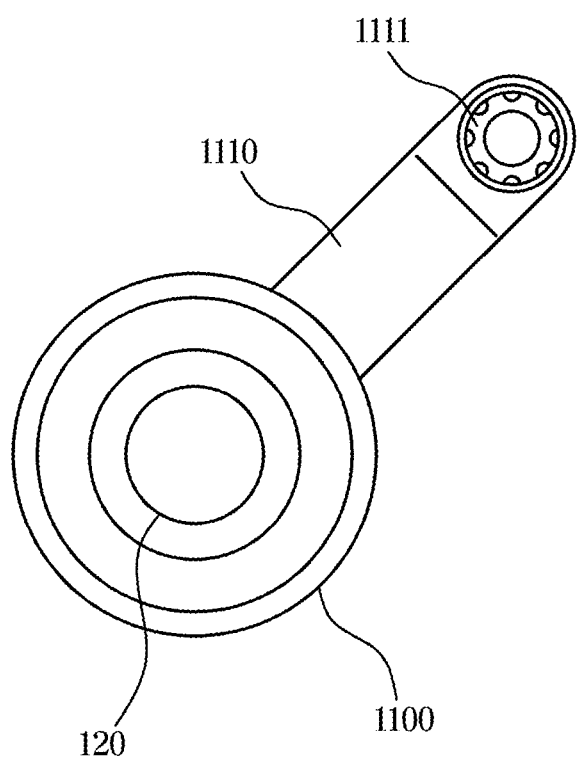

[FIG. 4]
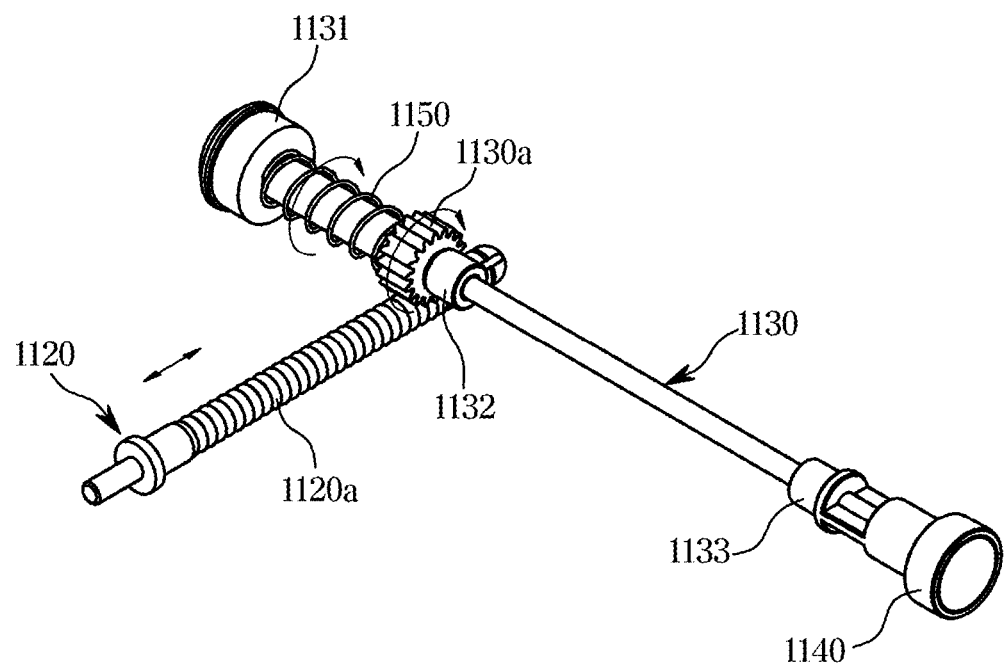

[FIG. 5]
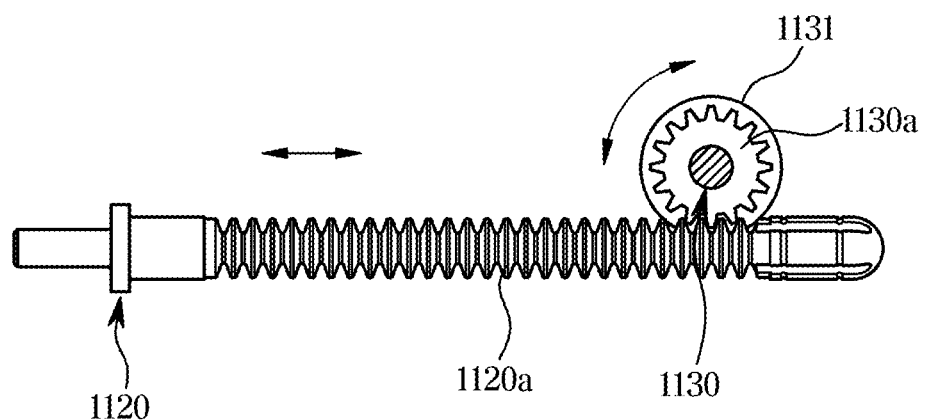

[FIG. 6]
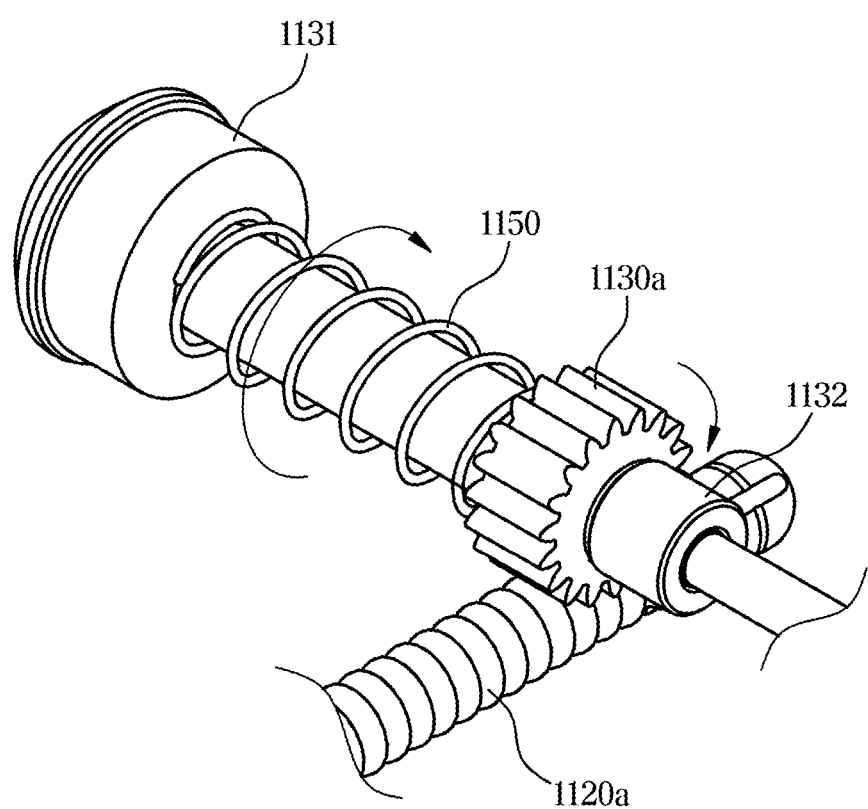

[FIG. 7]
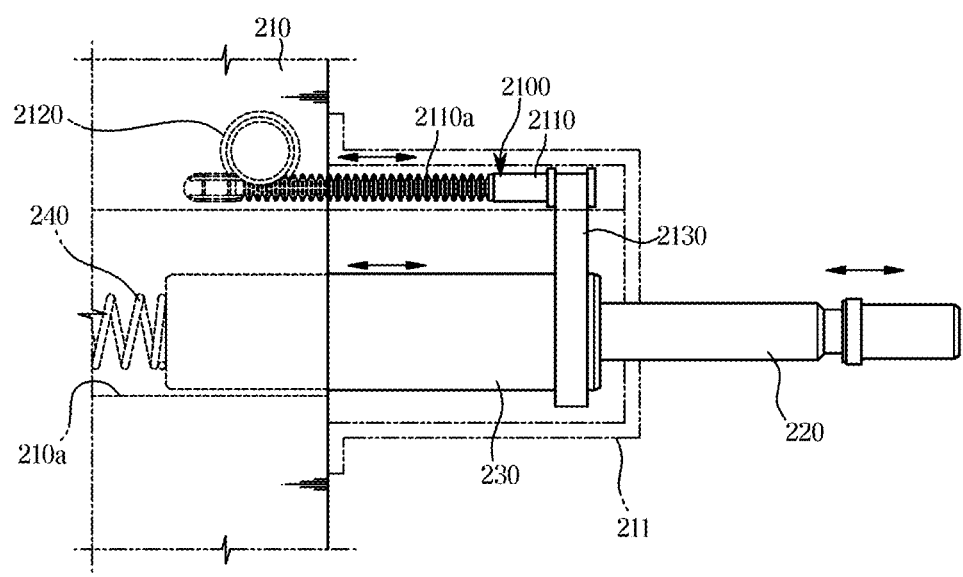

[FIG. 8]
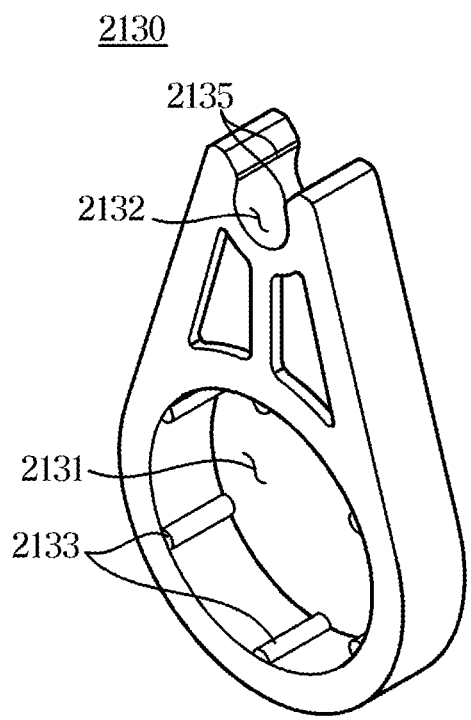

[FIG. 9]
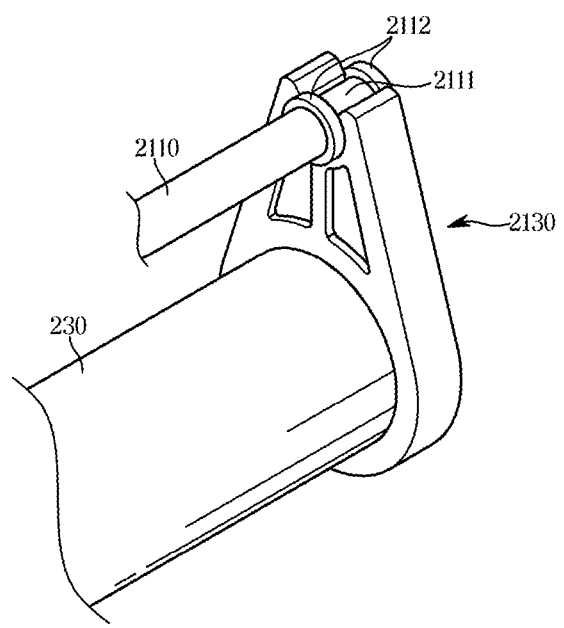

[FIG. 10]
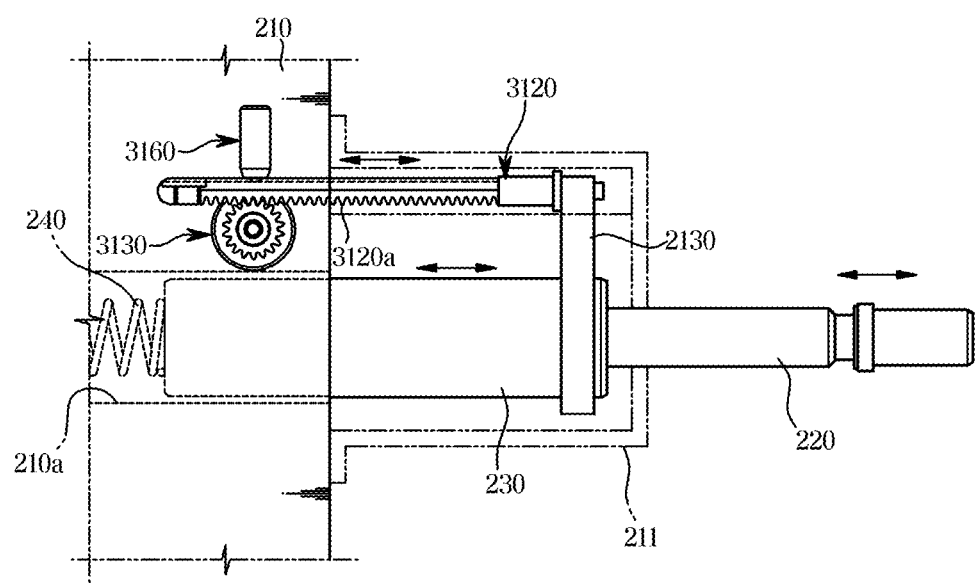

[FIG. 11]
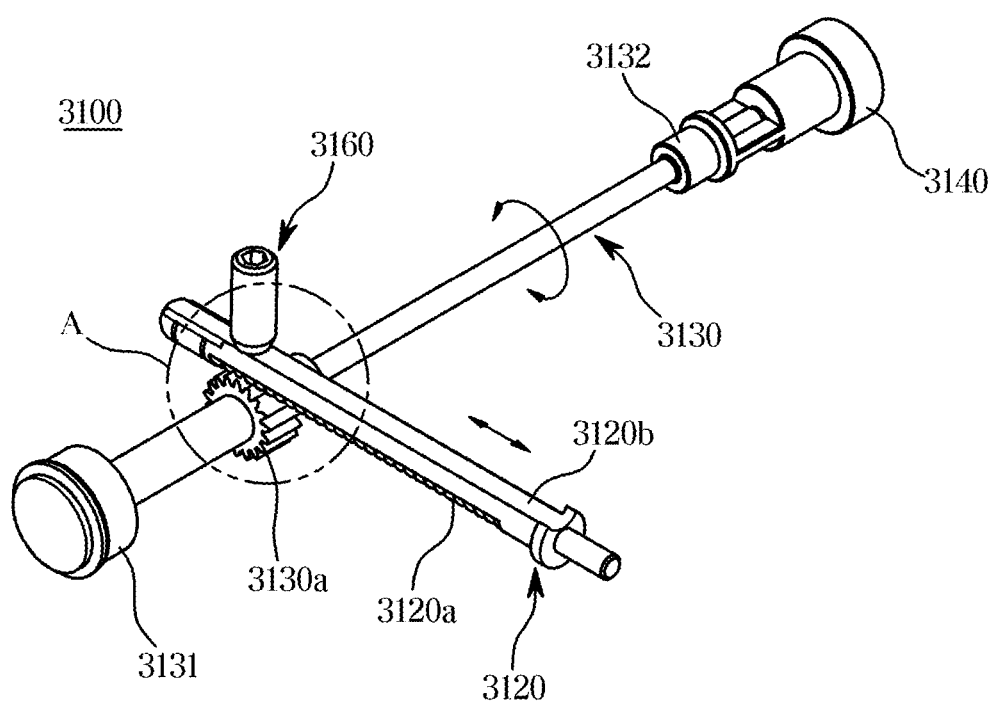

[FIG. 12]
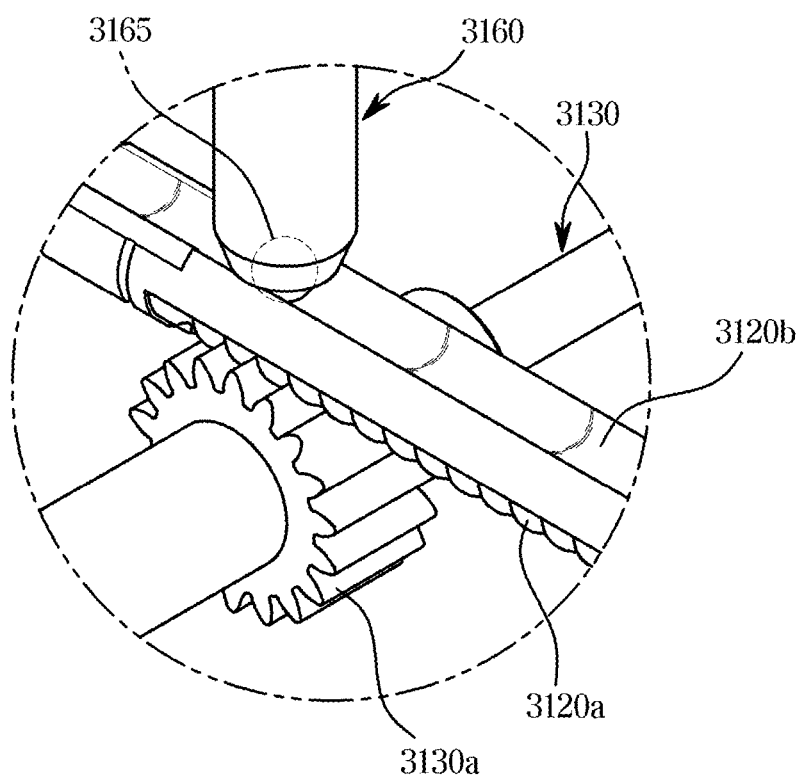

[FIG. 13]
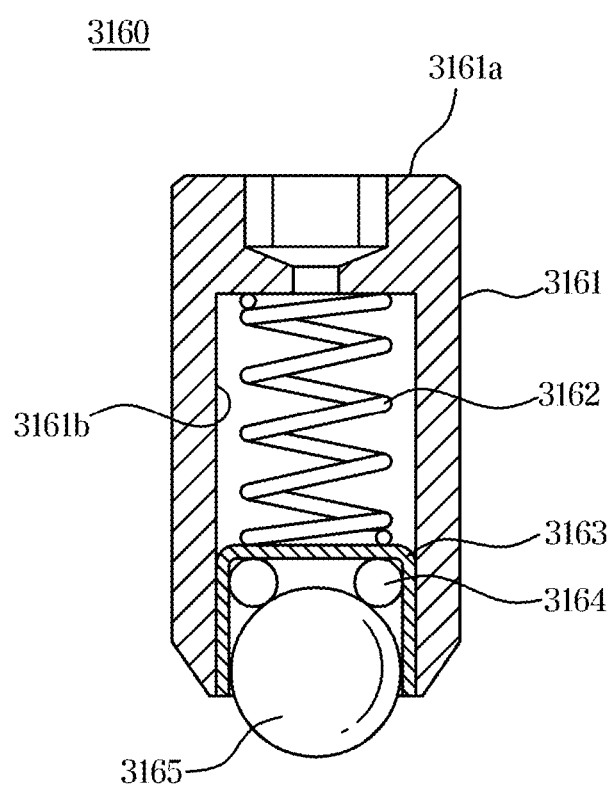

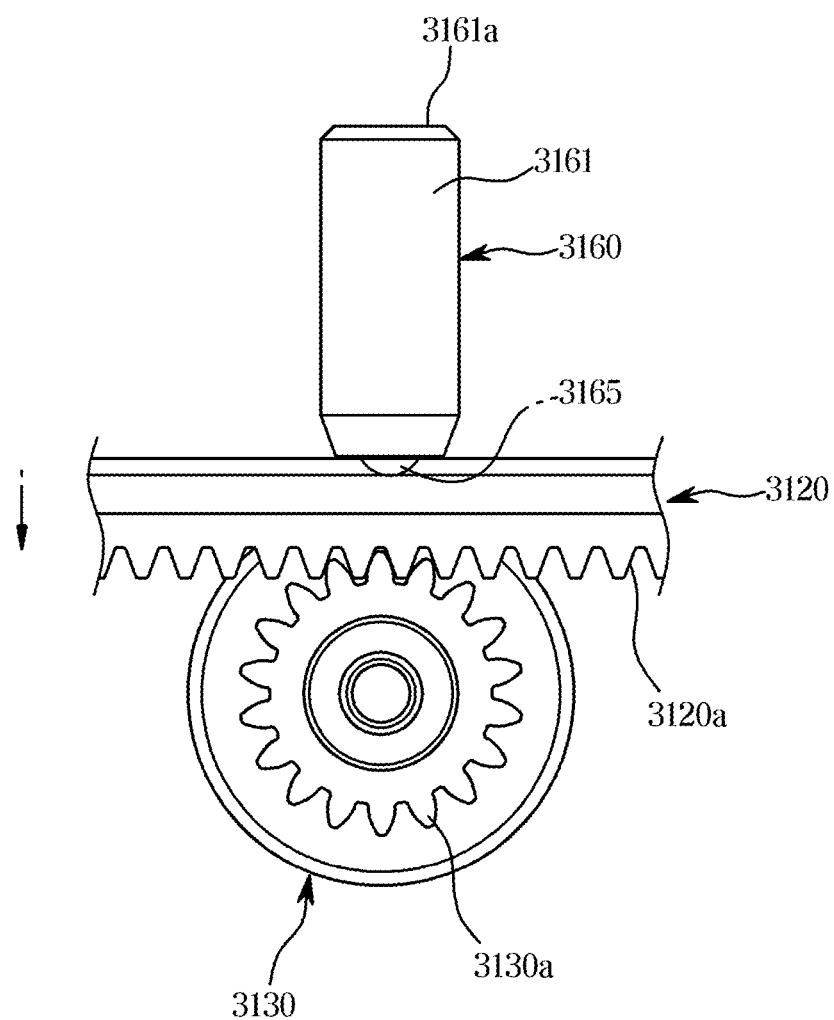
[FIG. 14]

[FIG. 15]
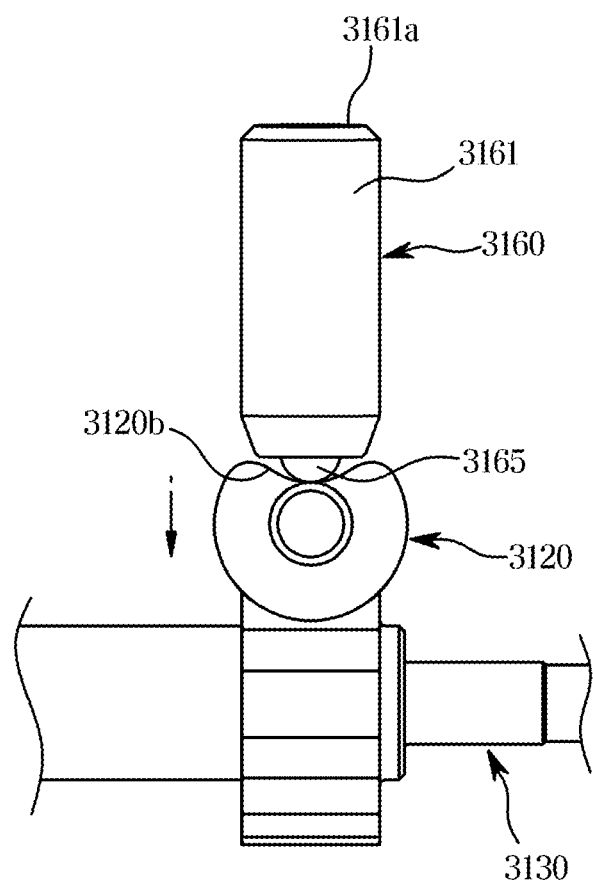

INSTALLATION STRUCTURE FOR PEDAL STROKE SENSOR

CROSS-REFERENCE TO RELATED APPLICATION

This application is based on and claims priority under 35 U.S.C. § 119 to Korean Patent Applications No. 10-2017-0126995, filed on Sep. 29, 2017, No. 10-2017-0127002, filed on Sep. 29, 2017, and No. 10-2017-0014472, filed on Sep. 29, 2017 in the Korean Intellectual Property Office, the disclosures of which are incorporated by reference herein in their entireties.

BACKGROUND

1. Field

The present disclosure relates to an installation structure for a pedal stroke sensor for measuring a movement distance of a pedal according to a driver's pedal effort.

2. Description of the Related Art

Vehicles essentially have a brake system for braking. Recently, various kinds of systems for obtaining a more stable and stronger braking force are being proposed.

Typical brake systems supply oil pressure required for braking to a wheel cylinder using a booster mechanically connected to a brake pedal when a driver presses the brake pedal with his/her foot. Recently, an electronic brake system in which a pedal stroke sensor senses, when a driver presses a brake pedal with his/her foot, a movement of the brake pedal to receive the driver's braking intention as an electrical signal, and supplies oil pressure required for braking to a wheel cylinder is widely used.

The pedal stroke sensor is installed in the brake pedal or in the master cylinder connected to the brake pedal to detect a displacement of the brake pedal that performs a translational or rotational motion by a driver's pedal effort, thereby controlling the brake system electrically. However, the pedal stroke sensor needs to adjust its installation location according to the type or structure of a vehicle, or the size of a brake pedal assembly increases according to the installation location of the pedal stroke sensor, which makes installing the brake pedal assembly in the vehicle difficult.

Meanwhile, a type of detecting the angle of a brake pedal among various kinds of pedal stroke sensors is installed around a hinge shaft on which a pedal arm rotates to measure a degree of movement of the brake pedal based on a change in output value according to a rotation angle of the brake pedal.

However, since the angle type pedal stroke sensor is installed in the brake pedal spaced from a brake module, correction for offset calibration is performed after assembly is completed, which deteriorates the calibration correction or quality.

Also, since the pedal stroke sensor detects a rotation angle by a contact method, it has a complicated structure, generates friction noise, and also has low detection reliability due to a change in durability.

PRIOR ART DOCUMENT

Korean Laid-open Patent Application No. 10-2012-0039171 (filed on Apr. 25, 2012)

SUMMARY

Therefore, it is an aspect of the present disclosure to provide an installation structure for a pedal stroke sensor having a simple structure and a high degree of mechanical precision. Further, it is another aspect of the present disclosure to reduce a space between gears for transferring power.

Additional aspects of the disclosure will be set forth in part in the description which follows and, in part, will be obvious from the description, or may be learned by practice of the disclosure.

In accordance with an aspect of the present disclosure, there is provided an installation structure for a pedal stroke sensor, including: a first shaft extending in parallel to a movement direction of a piston moving by an operation of a brake pedal, the first shaft including a rack gear; a second shaft including a measuring portion for sensing a rotation to detect a displacement of the brake pedal at one end, extending in a direction that is vertical to the first shaft, and including a pinion gear engaged with the rack gear; and a mounting member configured to couple a piston with the first shaft.

The installation structure for the pedal stroke sensor may further include an engagement maintenance portion disposed around the second shaft and configured to reduce a space between the rack gear and the pinion gear.

The engagement maintenance portion may include a torsion spring whose one end is fixed and whose the other end is coupled with the pinion gear to maintain an engaged state of the pinion gear and the rack gear.

The installation structure for the pedal stroke sensor may further include a support member which rotatably supports the second shaft, and on which one end of the torsion spring is fixed.

The mounting member may be connected to the first shaft using a fixing member, and the fixing member may be made of a rubber material.

The mounting member may include a coupling hole which is formed at one side of the mounting member in such a way to penetrate the mounting member and into which an outer circumferential surface of the piston is pressed along an inner circumferential surface of the mounting member, a coupling groove which is recessed at an outer side of the mounting member and into which an outer circumferential surface of the first shaft is pressed, and at least one coupling protrusion protruding from an inner circumferential surface of the coupling hole.

The mounting member may be manufactured by injection molding.

The first shaft may include a coupling portion rested in the inside of the coupling groove, and a pair of support protrusions protruding outward from both ends of the coupling portion and respectively supported on both surfaces of the mounting member.

The mounting member may further include a pair of resting protrusions protruding from the coupling groove and configured to prevent the first shaft rested in and coupled with the coupling groove from escaping from the coupling groove.

The installation structure for the pedal stroke sensor may further include a pressing portion configured to press the first shaft toward the second shaft.

The rack gear may face the second shaft, the first shaft may include a concave portion formed in the opposite side of the rack gear, and the pressing portion may press the concave portion to maintain an engaged state of the rack gear with the pinion gear.

The pressing portion may include: a housing; a pressing globe configured to roll and move along a guide surface formed in the housing; and an elastic member configured to provide an elastic force to the pressing globe outwardly in the housing, wherein a radius of an arc forming the concave portion is larger than a radius of the pressing globe so that the pressing globe presses the concave portion to restrict left and right movements of the first shaft.

A top end of the pressing portion may be fixed, and the pressing globe may protrude from a lower end of the pressing portion to press the concave portion.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a side view of an installation structure for a pedal stroke sensor according to a first embodiment of the present disclosure;

FIG. 2 is a perspective view of the installation structure for the pedal stroke sensor according to the first embodiment of the present disclosure when a housing is removed;

FIG. 3 is a front view of a piston and a mounting member according to the first embodiment of the present disclosure;

FIG. 4 is a perspective view of the pedal stroke sensor according to the first embodiment of the present disclosure;

FIG. 5 is a side view of the pedal stroke sensor according to the first embodiment of the present disclosure;

FIG. 6 is an enlarged view showing an operating structure of a first shaft and a second shaft according to the first embodiment of the present disclosure;

FIG. 7 is a perspective view of an installation structure for a pedal stroke sensor according to a second embodiment of the present disclosure when the installation structure is installed in a block;

FIG. 8 is a perspective view of a mounting member according to the second embodiment of the present disclosure;

FIG. 9 is a perspective view showing a state in which a piston is coupled with a first shaft by the mounting member according to the second embodiment of the present disclosure;

FIG. 10 is a side view of an installation structure for a pedal stroke sensor according to a third embodiment of the present disclosure when the installation structure is installed in a block;

FIG. 11 is a perspective view of the installation structure for the pedal stroke sensor according to the third embodiment of the present disclosure;

FIG. 12 is an enlarged view of a gear connecting portion in the installation structure for the pedal stroke sensor according to the third embodiment of the present disclosure;

FIG. 13 is a side cross-sectional view of a pressing portion according to the third embodiment of the present disclosure;

FIG. 14 is a side view of a pedal stroke sensor according to the third embodiment of the present disclosure; and FIG. 15 is a front view of the pedal stroke sensor according to the third embodiment of the present disclosure.

DETAILED DESCRIPTION

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the widths, lengths, thicknesses, etc. of components are more or less exaggeratedly shown. Throughout this specification, like reference numerals will be understood to refer to like components.

FIG. 1 is a side view of an installation structure for a pedal stroke sensor according to a first embodiment of the present disclosure, FIG. 2 is a perspective view showing a state when a housing is removed, and FIG. 3 is a front view of a piston on which a mounting member is disposed.

The installation structure for the pedal stroke sensor according to the first embodiment of the present disclosure may include a piston 1100 installed in a block 110 and moving forward and backward by an operation of a pedal, a mounting member 1110 mounted on the piston 1100, a first shaft 1120 coupled with the mounting member 1110, a second shaft 1130 having a pinion gear 1130a engaged with a rack gear 1120a of the first shaft 1120, and a measuring portion 1140 disposed on the second shaft 1130.

In the block 110, an input rod 120 may be disposed to move forward and backward according to a pedal effort from a brake pedal (not shown). The input rod 120 may be connected to the piston 1100 that moves horizontally according to a pedal effort from the brake pedal.

On the outer portion of the block 110, a cylinder 110a in which the piston 1100 moves forward and backward, and a coupling hole 110b into which the first shaft 1120 which will be described later is inserted to penetrate the inside and outside of the block 110 may be formed. The cylinder 110a and the coupling hole 110b may extend in a direction in which the piston 1100 and the first shaft 1120 move.

The piston 1100 may perform a reciprocating motion in the cylinder 110a in the block 110, and constitute a master cylinder in a vehicle brake system. The master cylinder may include a housing 1102 surrounding the piston 1100 and coupled to the block 110, the piston 1100 connected to the pedal, a cylinder chamber whose volume changes by the piston 1100, and an elastic member 1101 for providing a withdrawal force to the piston 1100. The piston 1100 may be pressed by the elastic member 1101 when a pedal effort applied on the pedal is released, and thus move backward.

The mounting member 1110 may extend in a direction that is vertical to the forward and backward movement direction of the piston 1100, and may be coupled with one end of the first shaft 1120 to fix the first shaft 1120. A fixing member 1111 may mediate a connection between the first shaft 1120 and the mounting member 1110. FIG. 3 shows the piston 1100 and the mounting member 1110 when the first shaft 1120 is removed from the fixing member 1111.

The fixing member 1111 may be made of a rubber material, and restrict forward and backward movements of the first shaft 1120, while allowing a horizontal movement of the first shaft 1120. Thereby, the fixing member 1111 may reduce transferring of a horizontal movement of the input rod 120 or the piston 1100 to the first shaft 1120. More specifically, the input rod 120 or the piston 1100 may move or vibrate horizontally when it moves forward or backward by a movement of the pedal, and in this case, the fixing member 1111 made of a rubber material may reduce transferring of the vibration to the first shaft 1120 through the elasticity of rubber.

FIG. 4 is a perspective view of the pedal stroke sensor according to the first embodiment of the present disclosure, FIG. 5 is a side view of the pedal stroke sensor, and FIG. 6 is an enlarged view of an operating structure of the first shaft 1120 and the second shaft 1130 for describing a method in which an engagement maintenance portion 1150 applies a rotational force to the rack gear 1120a such that the rack gear 1120a is always engaged with the pinion gear 1130a.

The first shaft 1120 may be vertically coupled with the mounting member 1110 to move together with the piston 1100 in the forward and backward movement direction of the piston 1100, and pivotally supported on the mounting member 1110 and the coupling hole 110b of the block 110. In the first shaft 1120, the rack gear 1120a may be disposed. A coupling member 1121 shown in FIG. 1 may be used to couple the first shaft 1120 with the mounting member 1110, and the coupling member 1121 may penetrate the mounting member 1110 to be coupled with the end of the first shaft 1120 by a bolting method.

The second shaft 1130 may extend in a direction that is vertical to the forward and backward movement direction of the first shaft 1120 in the inside of the block 110, and may be pivotally supported by a plurality of first to third supporting members 1131, 1132, and 1133. In the second shaft 1130, the pinion gear 1130a may be disposed to be engaged with the rack gear 1120a. The rack gear 1120a may be a rack gear, and the pinion gear 1130a may be a pinion gear to convert a linear motion of the first shaft 1120 to a rotary motion of the second shaft 1130.

The first to third supporting members 1131, 1132, and 1133 may pivotally support the second shaft 1130 in the block 110. The first to third supporting members 1131, 1132, and 1133 may be bushes or bearings for facilitating an axial-direction rotation of the second shaft 1130, while restricting forward, backward, leftward, and rightward movements of the second shaft 1130.

The measuring portion 1140 may be installed at one end of the second shaft 1130, and read a rotation signal of the second shaft 1130 to determine a position of the pedal. For example, the measuring portion 1140 may be an electronic speed sensor in which a magnet and an IC are installed. When the measuring portion 1140 senses a displacement of the input rod 120 by the second shaft 1130, the measuring portion 1140 may output a signal of the sensed displacement to an electronic control unit (not shown) to detect an amount of mechanical motion of the brake pedal, and control the brake system based on the detected amount of mechanical motion.

Referring to FIG. 6, the engagement maintenance portion 1150 may be disposed around the second shaft 1130, and reduce a space between the rack gear 1120a and the pinion gear 1130a. In other words, the engagement maintenance portion 1150 may be a torsion spring whose one end is fixed and whose other end is coupled with the pinion gear 1130a, and maintain the engaged state of the pinion gear 1130a with the rack gear 1120a.

For example, one end of the engagement maintenance portion 1150 may be fixed on the first supporting member 1131 fixed on the block 110, and the other end of the engagement maintenance portion 1150 may provide a rotational force to the pinion gear 1130a, thereby maintaining the engaged state of the pinion gear 1130a with the rack gear 1120a. When the pedal does not operate, the first shaft 1120 and the rack gear 1120a disposed on the first shaft 1120 may also be fixed without moving. Since the pinion gear 1130a rotates in the axial direction by the engagement maintenance portion 1150, the protrusions of the rack gear 1120a may be maintained in contact with the protrusions of the pinion gear 1130a.

Hereinafter, a method in which the pedal stroke sensor described above senses a displacement according to a movement of the input rod 120 will be described.

When a driver presses the brake pedal (not shown) with his/her foot for braking, the brake pedal may press the input rod 120 connected to the brake pedal so that the piston 1100 moves forward. At this time, the first shaft 1120 coupled with the piston 1100 may move forward so that the rack gear 1120a may rotate the pinion gear 1130a, and the measuring portion 1140 may also rotate by the second shaft 1130 rotating together with the pinion gear 1130a. Accordingly, the measuring portion 1140 may sense a change in magnetic force of the magnet to thus sense a movement displacement of the input rod 120.

That is, the pedal stroke sensor may convert a forward or backward movement of the first shaft 1120 mechanically connected to the piston 1100 of the master cylinder to a rotary motion of the pinion gear 1130a by a rack & pinion structure, and read a rotation signal using the measuring portion 1140 installed at the end of the second shaft 1130 (that is, a pinion shaft) to thereby determine a position of the pedal.

At this time, the teeth of the rack gear 1120a and the pinion gear 1130a of the rack & pinion structure may be always partially engaged with each other by the engagement maintenance portion 1150. Thereby, it may be possible to reduce a mechanical space, and to reduce an error that is generated between a movement amount of the pedal and a movement displacement value sensed by the measuring portion 1140.

FIG. 7 is a side view of an installation structure for a pedal stroke sensor according to a second embodiment of the present disclosure when the installation structure is installed in a block, FIG. 8 is a perspective view of a mounting member according to the second embodiment of the present disclosure, and FIG. 9 is a perspective view showing a state in which a piston is coupled with a first shaft by the mounting member according to the second embodiment of the present disclosure.

Referring to FIGS. 7, 8, and 9, an installation structure 2100 for a pedal stroke sensor according to the second embodiment of the present disclosure may include a first shaft 2110 extending in a movement direction of a piston 230 moving according to a movement of a brake pedal (not shown), a second shaft 2120 extending in a direction that is vertical to the first shaft 2110 and including a pedal stroke sensor for sensing a rotation at one end, and a mounting member 2130 for coupling the piston 230 with the first shaft 2110.

The block 210 may be a component constituting a master cylinder 210a, and in the block 210, an input rod 220 interworking with a brake pedal (not shown) operating by a driver's pedal effort may be disposed in such a way to be movable forward and backward. One end of the input rod 220 may be connected to the brake pedal, and the other end of the input rod 220 may be connected to the piston 230 of the cylinder 210a.

In the block 210, an installation hole may be formed to communicate the inside of the block 210 with the outside so that a cylinder 210a and a first shaft 2110 which will be described later are inserted in the block 210, wherein the piston 230 is movable forward and backward in the cylinder 210a. The cylinder 210a and the installation hole may extend in parallel to a movement direction of the piston 230 and the first shaft 2110 by a pedal effort from the brake pedal.

The piston 230 may move forward and backward on the cylinder 210a in the block 210 when a pedal effort is applied from the brake pedal and when a pedal effort applied from the brake pedal is released. A housing 211 may surround the piston 230 to be coupled with the block 210, and the cylinder 210a may move forward and backward by a pedal effort from the brake pedal, thereby changing the volume.

The rear portion of the piston 230 may be elastically supported by an elastic member 240. The elastic member 240 may be pressed when the piston 230 moves forward by a pedal effort from the brake pedal, and when a pedal effort applied on the brake pedal is released, the piston 230 may return to its original position by an elastic restoring force of the elastic member 240.

The first shaft 2110 may extend in parallel to the movement direction of the piston 230 that moves according to a pedal effort from the brake pedal. The first shaft 2110 may be inserted into the installation hole of the block 210, and supported movably in the axial direction. The first shaft 2110 may be coupled with the piston 230 by the mounting member 2130 which will be described later, and move forward and backward together with the piston 230. At one end of the first shaft 2110, a coupling portion 2111 and a support protrusion 2112 may be disposed to stably couple the first shaft 3110 with the mounting member 2130, and on the circumferential surface of the first shaft 2110, a rack gear 2110a may be disposed to be engaged with a pinion gear 2120a of the second shaft 2120 which will be described later. This will be described in detail, later.

The second shaft 2120 may extend in a direction crossing a translational movement direction of the first shaft 2110. At one end of the second shaft 2120, a support member may be disposed to rotatably support the second shaft 2120 in the inside of the block 210, and at the other end of the second shaft 2120, a pedal stroke sensor may be disposed to sense a rotation of the second shaft 2120 to detect a displacement of the brake pedal. Also, at the center of the second shaft 2120, the pinion gear 2120a may be disposed to be engaged with the rack gear 2110a of the first shaft 2110 to convert a translational motion of the first shaft 2110 by an operation of the piston 230 to a rotary motion of the second shaft 2120.

The pedal stroke sensor may be disposed at the end of the second shaft 2120 to sense a degree of rotation of the second shaft 2120, thereby detecting an operation location or displacement of the brake pedal. For example, the pedal stroke sensor may be an electronic speed sensor in which a magnet and an IC are installed. When the pedal stroke sensor senses a displacement of the brake pedal by a rotation of the second shaft 2120, the pedal stroke sensor may output a signal of the sensed displacement to an electronic control unit (not shown), and the electronic control unit may control the brake system based on the signal.

The mounting member 2130 may couple the piston 230 with the first shaft 2110 to restrict movements and operations of the piston 230 and the first shaft 2110. The mounting member 2130 may include a coupling hole 2131 which is formed at one side of the mounting member 2130 in such a way to penetrate the mounting member 2130 and into which the outer circumferential surface of the piston 230 is pressed along the inner circumferential surface of the mounting member 2130, a coupling groove 2132 which is recessed at the outer side of the mounting member 2130 and into which the circumferential surface of the first shaft 2110 is pressed, and at least one coupling protrusion 2133 protruding from the inner circumferential surface of the coupling hole 2131.

The mounting member 2130 may be made of a synthetic resin such as plastic and manufactured by injection-molding, for the weight lightening of product, the cost reduction, and the simplification of a manufacturing process. Also, the mounting member 2130 may be formed in the form of a plate in order to improve the installation of product and to make better use of vehicle space. The one side of the mounting member 2130 in which the coupling hole 2131 is formed may have a size corresponding to the external diameter of the piston 230, and the other side of the mounting member 2130 in which the coupling groove 2132 is formed may reduce the area of the cross section to have a size corresponding to the external diameter of the first shaft 2110.

The coupling hole 2131 may penetrate the mounting member 2130 at the one side of the mounting member 2130, wherein the internal diameter of the coupling hole 2131 is equal to the external diameter of the piston 230. On the inner circumferential surface of the coupling hole 2131, a plurality of coupling protrusions 2133 may protrude to improve a coupling force of the mounting member 2130 with the piston 230. In the drawings, six coupling protrusions 2133 may be formed, however, the number and locations of the coupling protrusions 2133 are not limited.

The coupling groove 2132 may be recessed in the other side of the mounting member 2130, and the internal diameter of an inner resting area of the coupling groove 2132 may be equal to the outer diameter of the coupling portion 2111 of the first shaft 2110. On the coupling groove 2132, a pair of resting protrusions 2135 may protrude inward to prevent the first shaft 2110 inserted into and rested in the coupling groove 2132 from escaping from the coupling groove 2132.

Meanwhile, the first shaft 2110 may include the coupling portion 2111 rested in the inside of the coupling groove 2132, and a pair of support protrusions 2112 protruding outward from both ends of the coupling portion 2111 and respectively supported on both surfaces of the mounting member 2130, for stable and effective coupling with the coupling groove 2132 of the mounting member 2130. The external diameter of the coupling portion 2111 of the first shaft 2110 may be smaller than the diameter of the coupling groove 2132 so that the coupling portion 2111 easily enters the coupling groove 2132 of the mounting member 2130 and is rested on the coupling groove 2132 to be coupled with the mounting member 2130. The pair of support protrusions 2112 may expand outward from both ends of the coupling portion 2111 to closely contact both surfaces of the mounting member 2130, thereby preventing the mounting member 2130 from slipping from the coupling groove 2132 when the first shaft 2110 performs a translational motion.

The pair of resting protrusions 2135 may protrude from both opposite surfaces of the coupling groove 2132 of the mounting member 2130 to narrow the width of the coupling groove 2132. The first shaft 2110 rested on the coupling groove 2132 and coupled with the mounting member 2130 may be caught by the resting protrusions 2135 and prevented from escaping outward from the coupling groove 2132.

Hereinafter, operations of the first shaft 2110 and the second shaft 2120 will be described. Referring to the drawings, the rack gear 2110a of the first shaft 2110 may be engaged with the pinion gear 2120a of the second shaft 2120 such that a translational motion of the first shaft 2110 coupled with the piston 230 by the mounting member 2130 is converted to a rotary motion of the second shaft 2120.

When a driver applies a pedal effort on the brake pedal in order to brake the vehicle, the input rod 220 connected to the brake pedal may press the piston 230 to move the piston 230 forward. At this time, the first shaft 2110 restricted from moving by the mounting member 2130 together with the piston 230 may also move forward together with the piston 230, and the pinion gear 2120a may rotate by the rack gear 2110a disposed on the first shaft 2110 so that the second shaft 2120 may rotate.

The pedal stroke sensor installed at one end of the second shaft 2120 may sense a change in magnetic force of the magnet by the rotation of the second shaft 2120 to detect a displacement of the brake pedal. In summary, the rack gear 2110a of the first shaft 3110 and the pinion gear 2120a of the second shaft 2120 may convert a translational motion of the first shaft 2110 to a rotary motion of the second shaft 2120 by the rack & pinion structure, and the pedal stroke sensor may sense a rotation of the second shaft 2120 to detect information about a displacement of the brake pedal.

FIG. 10 is a side view of an installation structure for a pedal stroke sensor according to a third embodiment of the present disclosure when the installation structure is installed in a block. FIG. 11 is a perspective view of the installation structure for the pedal stroke sensor according to the third embodiment of the present disclosure, and FIG. 12 is an enlarged view of an "A" area of FIG. 11 and shows a gear connecting portion.

Referring to FIGS. 10, 11, and 12, the pedal stroke sensor according to the third embodiment of the present disclosure may include a first shaft 3120 moving forward and backward according to a movement of a brake pedal, a second shaft 3130 including a pinion gear 3130a engaged with a rack gear 3120a of the first shaft 3120, a measuring portion 3140 disposed on the second shaft 3130, and a pressing portion 3160 pressing the first shaft 3120 toward the second shaft 3130. The pedal stroke sensor may be installed in a modulator block 210 that adjusts oil pressure according to an operation of the brake pedal.

In the block 210, the input rod 220 may be disposed to move forward and backward according to a pedal effort from a brake pedal (not shown). The input rod 220 may move horizontally according to a pedal effort from the brake pedal, and the first shaft 3120 may move forward and backward together with the input rod 220 by the same distance as the movement distance of the input rod 220.

The first shaft 3120 may move forward and backward by interworking with the brake pedal or the input rod 220, and be pivotally supported on the block 210. The first shaft 3120 may include a rack gear 3120a. The rack gear 3120a may face the second shaft 3130, and in the opposite side of the rack gear 3120a, a concave portion 3120b may be formed to be pressed by the pressing portion 3160 which will be described later.

The second shaft 3130 may be disposed to be vertical to the forward and backward movement direction of the first shaft 3120, and pivotally supported in the inside of the block 210. The second shaft 3130 may include the pinion gear 3130a that is engaged with the rack gear 3120a. The rack gear 3120a may be a rack gear, and the pinion gear 3130a may be a pinion gear to convert a linear motion of the first shaft 3120 to a rotary motion of the second shaft 3130.

First and second supporting members 3131 and 3132 may pivotally support the second shaft 3130 in the block 210. The supporting members 3131 and 3132 may be bushes or bearings for facilitating an axial-direction rotation of the second shaft 3130, while restricting forward, backward, leftward, and rightward movements of the second shaft 3130.

The measuring portion 3140 may be installed at one end of the second shaft 3130, and read a rotation signal of the second shaft 3130 to determine a position of the pedal. For example, the measuring portion 3140 may be an electronic speed sensor in which a magnet and an IC are installed. When the measuring portion 3140 senses a displacement of the input rod 220 by the second shaft 3130, the measuring portion 3140 may output a signal of the sensed displacement to an electronic control unit (not shown) to detect an amount of mechanical motion of the brake pedal, and control the brake system based on the detected amount of mechanical motion.

FIG. 13 is a side cross-sectional view of a pressing portion according to the third embodiment of the present disclosure. FIGS. 14 and 15 are a side view and front view of a pedal stroke sensor according to the third embodiment of the present disclosure. Referring to FIGS. 13, 14, and 15, the pressing portion 3160 may engage the rack gear 3120a with the pinion gear 3130a, while restricting left and right movements of the first shaft 3120.

The pressing portion 3160 may include a housing 3161, a pressing globe 3165 moving forward and backward along a guide surface 3161b formed in the housing 3161, and an elastic member 3162 for providing an elastic force to the pressing globe 3165 outwardly in the housing 3161. The pressing globe 3165 may press the concave portion 3120 to restrict left and right movements of the first shaft 3120.

A top end 3161a of the pressing portion 3160 may be fixed, and a lower end of the pressing portion 3160 may press the concave portion 3120b through the protruding pressing globe 3165. At this time, an accommodating member 3163 may move along the guide surface 3161b of the housing 3161, and the elastic member 3162 may be installed between the inner surfaces of the housing 3161 and the accommodating member 3163 to press the accommodating member 3163 accommodating the pressing globe 2165 outwardly.

The pressing globe 3165 of the pressing portion 3160 may press the concave portion 3120b forming an arc-shaped cross-section to restrict the left and right movements of the first shaft 3120, and to guide the forward and backward movements of the first shaft 3120. Since the pressing globe 3165 is pressed outward by the elastic member 3162 in the housing 3161, the pressing globe 3165 may cause the first shaft 3120 to slip along the arc of the concave portion 3120b. The radius of the arc forming the concave portion 3120b may be larger than the radius of the pressing globe 3165 so that the pressing globe 3165 may move along the curved surface of the concave portion 3120b.

A resting ring 3164 may rotatably support the pressing globe 3165. The resting ring 3164 may rotatably support the pressing globe 3165 using a bearing, etc. to reduce friction resistance generated when the pressing globe 3165 rotates.

According to the third embodiment, a forward or backward movement of the first shaft 3120 including the rack gear 3120a mechanically fixed on the piston of the master cylinder may be converted to a rotary motion of the pinion gear 3130a in the block by the rack & pinion structure. Thereby, the measuring portion 3140 installed at the end of the second shaft 3130 may read a rotation signal to determine a position of the pedal.

Meanwhile, the pressing portion 3160 may press the first shaft 3120 toward the second shaft 3130 to cause the teeth of the rack gear 3120a to be engaged with the teeth of the pinion gear 3130a. Furthermore, the pressing globe 3165 of the pressing portion 3160 may press the concave portion 3120b having an arc-shaped cross-section to restrict the left and right movements of the first shaft 3120, while guiding forward and backward rolling movements of the first shaft 3120.

The installation structure for the pedal stroke sensor according to the third embodiment of the present disclosure may improve a degree of mechanical precision of a gear type among embedded pedal travel sensors (PTSs) that are installed in an electronic brake system.

Also, since the pressing portion performs a space compensating function of causing the teeth of the rack gear 3120a of the rack & pinion structure to be always engaged with the teeth of the pinion gear 3130a, and a function of restricting left and right vibrations of the first shaft 3120, it may be possible to effectively reduce a mechanical space and excessive friction between components.

The installation structure for the pedal stroke sensor according to the present disclosure may improve a degree of mechanical precision of a gear type among embedded PTSs that are installed in an electronic brake system.

Also, by causing the teeth of the rack gear of the rack & pinion structure to be always partially engaged with the teeth of the pinion gear through the engagement maintenance portion, it may be possible to effectively reduce a mechanical space, and to reduce an error that is generated between a movement amount of the pedal and a movement displacement value sensed by the measuring portion.

In the installation structure for the pedal stroke sensor according to the present disclosure, since the pressing portion performs a space compensating function of causing the teeth of the rack gear of the rack & pinion structure to be always engaged with the teeth of the pinion gear, and a function of restricting left and right vibrations of the first shaft, it may be possible to effectively reduce a mechanical space and excessive friction between components The installation structure for the pedal stroke sensor according to the current embodiment may improve assembly and easiness of installation of the pedal stroke sensor through a simple structure.

The installation structure for the pedal stroke sensor according to the current embodiment may reduce the force of labor and a processing time required for assembly and installation, thereby reducing manufacturing cost.

The installation structure for the pedal stroke sensor according to the current embodiment may miniaturize the brake pedal and the master cylinder assembly so that they are easily installed in a vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An installation structure for a pedal stroke sensor, comprising:
   a first shaft extending in parallel to a movement direction of a piston moving by an operation of a brake pedal, the first shaft including a rack gear;
   a second shaft including a measuring portion for sensing a rotation to detect a displacement of the brake pedal at one end, extending in a direction that is vertical to the first shaft, and including a pinion gear engaged with the rack gear; and
   a mounting member configured to couple a piston with the first shaft.

2. The installation structure for the pedal stroke sensor according to claim 1, further comprising an engagement maintenance portion disposed around the second shaft and configured to reduce a space between the rack gear and the pinion gear.

3. The installation structure for the pedal stroke sensor according to claim 2, wherein the engagement maintenance portion includes a torsion spring whose one end is fixed and whose the other end is coupled with the pinion gear to maintain an engaged state of the pinion gear and the rack gear.

4. The installation structure for the pedal stroke sensor according to claim 3, further comprising a support member which rotatably supports the second shaft, and on which one end of the torsion spring is fixed.

5. The installation structure for the pedal stroke sensor according to claim 1, wherein the mounting member is connected to the first shaft using a fixing member, and
   the fixing member is made of a rubber material.

6. The installation structure for the pedal stroke sensor according to claim 1, wherein the mounting member comprises a coupling hole which is formed at one side of the mounting member in such a way to penetrate the mounting member and into which an outer circumferential surface of the piston is pressed along an inner circumferential surface of the mounting member, a coupling groove which is recessed at an outer side of the mounting member and into which an outer circumferential surface of the first shaft is pressed, and at least one coupling protrusion protruding from an inner circumferential surface of the coupling hole.

7. The installation structure for the pedal stroke sensor according to claim 6, wherein the mounting member is manufactured by injection molding.

8. The installation structure for the pedal stroke sensor according to claim 7, wherein the first shaft comprises a coupling portion rested in the inside of the coupling groove, and a pair of support protrusions protruding outward from both ends of the coupling portion and respectively supported on both surfaces of the mounting member.

9. The installation structure for the pedal stroke sensor according to claim 6, wherein the mounting member further comprises a pair of resting protrusions protruding from the coupling groove and configured to prevent the first shaft rested in and coupled with the coupling groove from escaping from the coupling groove.

10. The installation structure for the pedal stroke sensor according to claim 1, further comprising a pressing portion configured to press the first shaft toward the second shaft.

11. The installation structure for the pedal stroke sensor according to claim 10, wherein the rack gear faces the second shaft,
    the first shaft includes a concave portion formed in the opposite side of the rack gear, and
    the pressing portion presses the concave portion to maintain an engaged state of the rack gear with the pinion gear.

12. The installation structure for the pedal stroke sensor according to claim 11, wherein the pressing portion comprises:
    a housing;
    a pressing globe configured to roll and move along a guide surface formed in the housing; and
    an elastic member configured to provide an elastic force to the pressing globe outwardly in the housing,
    wherein a radius of an arc forming the concave portion is larger than a radius of the pressing globe so that the pressing globe presses the concave portion to restrict left and right movements of the first shaft.

13. The installation structure for the pedal stroke sensor according to claim 12, wherein a top end of the pressing portion is fixed, and the pressing globe protrudes from a lower end of the pressing portion to press the concave portion.

\* \* \* \* \*